United States Patent [19]

Brakebill

[11] 4,099,539

[45] Jul. 11, 1978

[54] CONTROL SYSTEM AND CONTROL DEVICE THEREFOR

[75] Inventor: Harold G. Brakebill, Concord, Tenn.

[73] Assignee: Robertshaw Controls Company, Richmond, Va.

[21] Appl. No.: 800,211

[22] Filed: May 25, 1977

[51] Int. Cl.$^2$ .................................... G05D 16/00

[52] U.S. Cl. .................................... 137/84; 137/85; 137/624.11

[58] Field of Search ................ 137/82, 85, 84, 624.11, 137/624.18, 624.2; 123/119 A

[56] References Cited

U.S. PATENT DOCUMENTS

| | | | |
|---|---|---|---|
| 3,819,113 | 6/1974 | Puster | 137/85 X |
| 4,022,237 | 5/1977 | Wertheimer | 137/85 |

*Primary Examiner*—Alais Cohan

*Attorney, Agent, or Firm*—Candor, Candor & Tassone

[57] ABSTRACT

A system having a vacuum source, a pressure source and a pressure operated control device. A pneumatically operated control unit is provided for increasing a pressure signal from the pressure source to the device as the value of the pressure of the pressure source increases from a first value to a second value and for thereafter decreasing the pressure signal from the pressure source to the device as the value of the pressure of the pressure source further increases from the second value thereof to a third value thereof, the control unit producing the signal in substantially the same manner but at different values for different levels of vacuum at the vacuum source thereof. The control unit can include a temperature responsive valve for substantially linearly changing the magnitude of the signal to the device in relation to a certain temperature range.

20 Claims, 7 Drawing Figures

CONTROL SYSTEM AND CONTROL DEVICE THEREFOR

This invention relates to an improved control system and to an improved control device for such a system or the like.

It is known that engine control systems for internal combustion engines have been provided where each has an exhaust gas recirculation valve for taking part of the exhaust gas of the internal combustion engine and diverting the same into the intake manifold to be again utilized in the internal combustion engine for pollution control purposes. However, the degree of exhaust gas recirculation must be regulated according to various engine parameters, such as the RPM speed of the engine, the value of the manifold absolute pressure, etc.

It was suggested by others that it would be desirable to provide such a control system wherein the exhaust gas recirculation valve is pressure operated and pneumatically operated control means is provided for increasing a pressure signal from the engine air pump pressure supply to the valve as the engine RPM speed increases from a first value to a second value and for thereafter decreasing the pressure signal from the supply to the valve as the engine RPM speed further increases from the second value thereof to a third value, the control means producing the signal in substantially the same manner but at different values of vacuum at the manifold vacuum source thereof.

Accordingly, it is a feature of this invention to provide a control system that has pneumatically operated control means that can operate in the above manner for such purposes or the like.

Another feature of this invention is to provide such a control system with a temperature responsive valve means for substantially linearly changing the magnitude of the signal to the pressure operated exhaust gas recirculation valve in relation to a certain temperature range of the engine.

In particular, one embodiment of this invention provides a control system having a vacuum source, a pressure source and a pressure operated control device. A pneumatically operated control means is provided by this invention for increasing a pressure signal from the pressure source to the control device as the pressure valve of the pressure source increases from a first value to a second value and for thereafter decreasing the pressure signal from the pressure source to the control device as the pressure value of the pressure source further increases from the second value thereof to a third value thereof, the control means producing the signal in substantially the same manner but at different values for different levels of vacuum at the vacuum source thereof.

Such a control system can also include a temperature responsive valve means for substantially linearly changing the magnitude of the signal to the control device in relation to a certain temperature range.

Accordingly, it is an objective of this invention to provide an improved control system having one or more of the novel features of this invention as set forth above or hereinafter shown or described.

Another objective of this invention is to provide an improved control device for such a control system, the control device of this invention having one or more of the novel features of this invention as set forth above or hereinafter shown or described.

Other objects, uses and advantages of this invention are apparent from a reading of this description which proceeds with reference to the accompanying drawings forming a part thereof and wherein.

Figure 1:
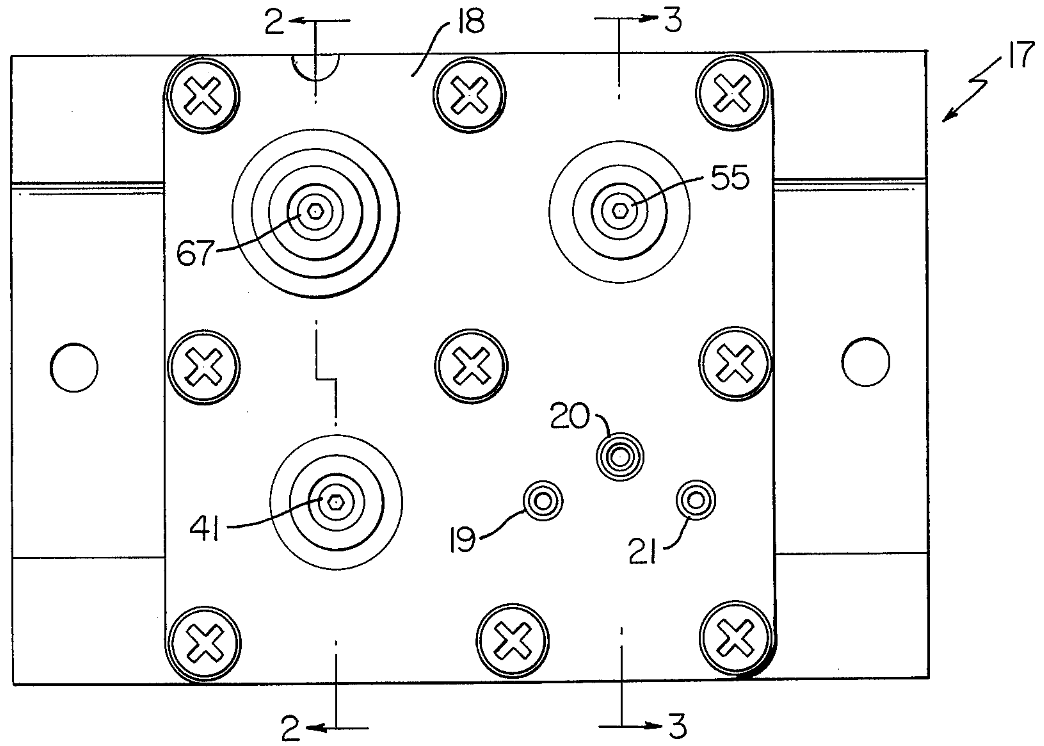
FIG. 1 is a top view of one embodiment of the improved control device of this invention.

While the various features of this invention are hereinafter described and illustrated as being particularly adapted to provide a control system for an internal combustion engine, it is to be understood that various features of this invention can be utilized singly or in any combination thereof to provide a control system for a conditioned pressure signal for other apparatus as desired.

Therefore, this invention is not to be limited to only the embodiment illustrated in the drawings, because the drawings are merely utilized to illustrate one of the wide variety of uses of this invention.

Figure 4:
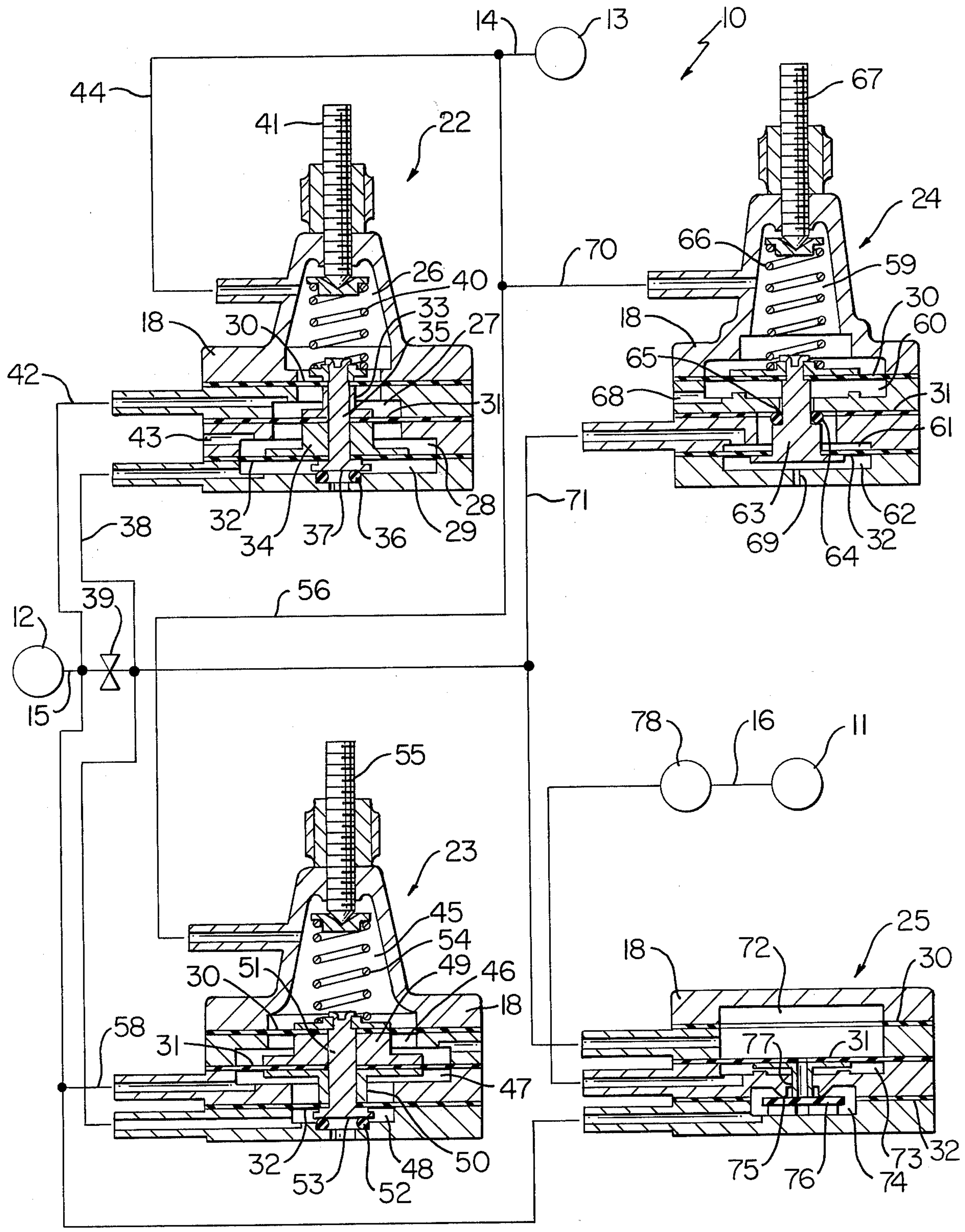
FIG. 4 is a schematic view illustrating the control parts of the control device of FIG. 1 with the control parts being disposed in one embodiment of the control system of this invention.

Referring now to FIG. 4, the control system 10 of this invention includes a pressure operated control device 11, such as a pressure operated exhaust gas recirculation valve for an internal combustion engine (not shown) for recirculating exhaust gas to the intake manifold of the engine as the output signal pressure to the device 11 increases and to decrease the amount of exhaust gas recirculation to the intake manifold of the engine as the output signal pressure to the device 11 decreases for the reasons previously set forth.

The system 10 includes a pressure source 12, such as an air pump pressure supply means operated by the internal combustion engine for supplying air pressure to the system 10 that increases as the engine speed increases in a manner well known in the art.

The system 10 also includes a vacuum source 13, such as the intake manifold of the internal combustion engine that produces a manifold absolute pressure and directs the same to the system 10 through a suitable conduit means 14 for a purpose hereinafter described, the pressure source 12 supplying fluid pressure to the system 10 through a conduit means 15 and the control device 11 receiving the pressure output signal of the system 10 from a conduit means 16.

Figure 2:
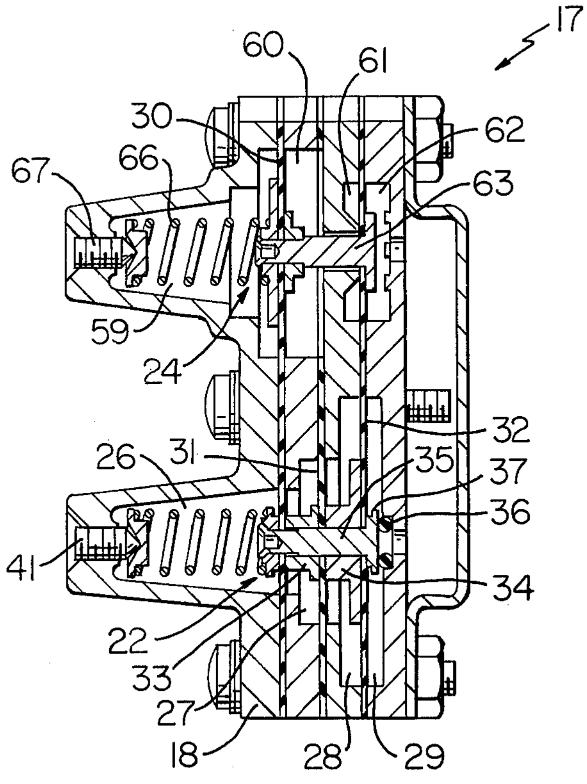
FIG. 2 is a cross-sectional view taken on line 2—2 of FIG. 1.
Figure 3:
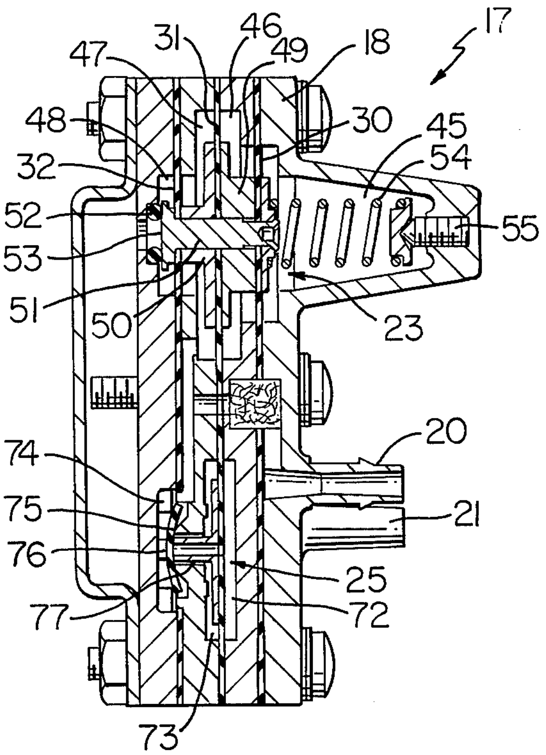
FIG. 3 is a cross-sectional view taken on line 3—3 of FIG. 1.

The control system 10 includes a control device of this invention that is generally indicated by the reference numeral 17 in FIGS. 1-3 and comprises a housing means 18 having a plurality of control components therein and three nipple means 19, 20 and 21 for effectively and respectively being fluidly interconnected to the conduit means 14, 15 and 16 of the system 10 previously described, the control components of the control device 17 being schematically illustrated in FIG. 4 and comprising a first controller that is indicated by the reference numeral 22, a second controller that is generally indicated by the reference numeral 23, a third controller that is generally indicated by the reference numeral 24, and a volume booster relay that is generally indicated by the reference numeral 25.

Since it is believed easier to understand the control components 22-25 in the form illustrated in FIG. 4 rather than in their packaged form for the control device 17 of FIGS. 1-3, the control components 22-25 will be described in relation to the schematic system 10 illustrated in FIG. 4 with the understanding that the control components 22-25 can be packaged in the single housing means 18 as illustrated in FIGS. 1-3 to provide a self-contained control device. However, it is to be understood that this invention is not to be limited to a self-contained control device 17 as the control device of this invention can comprise the control components 22-25 mounted separately as desired.

The housing means 18 of the first controller 22A is divided into four chambers 26, 27, 28 and 29 by three flexible diaphragms 30, 31 and 32, the diaphragms 30-32 being separated from each other by interposed spacer means 33 and 34 and being fastened together in stacked relation by a fastening member 35. The housing means 18 includes a resilient valve seat 36 that projects into the chamber 29 and is adapted to be opened and closed by a valve member 37 that comprises the end of the fastening member 35 and is under the control of the diaphragms 30-32, the valve seat 36 leading to the atmosphere while the chamber 29 is interconnected to a conduit 38 which, in turn, is interconnected to the pressure source conduit 15 downstream of a restrictor 39 thereof.

The diaphragm stack 30-32 is normally urged in a direction to close the valve seat 36 by a compression spring 40 disposed in the chamber 26 and having its force adjustable by suitable adjusting means 41 in a manner conventional in the art.

The pressure source conduit 15 upstream of the restrictor 39 is interconnected to the chamber 27 of the first controller by a conduit means 42.

The chamber 28 is interconnected to the atmosphere through a vent port 43.

The conduit means 14 of the vacuum source 13 is interconnected by a branch conduit means 44 to the chamber 26 of the first controller 22.

The second controller 23 is formed similar to the first controller 22 and has its housing means 18 divided into four chambers 45, 46, 47 and 48 by the same three flexible diaphragms 30, 31 and 32, the diaphragms 30-32 being separated by spacers 49 and 50 fastened together in stacked relation by a fastening member 51. A resilient valve seat 52 projects into the chamber 48 and is opened and closed by a valve member 53 that comprises the end of the fastening member 51.

The diaphragm stack 30-32 of the second controller 23 is normally urged in a direction to close the valve seat 52 by a compression spring 54 disposed in the chamber 45 and having its force adjustable by a suitable adjusting means 55 in a manner conventional in the art.

The conduit 14 from the vacuum source 13 is interconnected by a branch conduit 56 to the chamber 45 of the controller 23.

The chamber 48 of the controller 23 is interconnected to the conduit means 38 that is interconnected to the conduit 15 downstream of the restrictor 39 thereof.

The chamber 47 of the second controller 23 is interconnected to a conduit means 58 that leads to the conduit 42 that is interconnected to the air pressure conduit 15 at a point upstream of the restrictor 39 thereof as illustrated.

The housing means 18 of the third controller 24 is divided into chambers 59, 60, 61 and 62 by the three flexible diaphragms 30, 31 and 32, the diaphragms 30 and 31 being interconnected together by a fastening member 63 that carries a resilient valve member 64 for opening and closing a valve seat 65 disposed between the chamber 60 and 61. The diaphragm stack 30 and 32 is normally urged to open the valve seat 65 by a compression spring 66 disposed in the chamber 59 and having its force adjustable by a suitable adjusting means 67 in a manner conventional in the art.

The chambers 60 and 62 of the third controller 24 are respectively interconnected to the atmosphere by vent ports 68 and 69 formed in the housing means 18 while the chamber 59 is interconnected by a conduit 70 that interconnects with the conduit 56 that leads from the vacuum source conduit 14.

The chamber 61 of the third controller 24 is interconnected by a branch conduit 71 that is interconnected to the conduit 15 downstream of the restrictor 39.

The fourth controller 25 comprises a booster relay and has its housing means 18 divided into three chambers 72, 73 and 74 by the diaphragm 31 and valve seat 75 that interconnects the chamber 74 with the chamber 73 and is opened and closed by a resilient valve member 76 normally urged to its closed position by its natural bias and being moved to its open position by a tubular member 77 that projects through the valve seat 75 and respectively engages the valve member 76 and the diaphragm 31.

The chamber 72 of the fourth controller 25 is interconnected to the conduit 71 while the chamber 74 thereof is interconnected to the conduit 42.

The chamber 73 of the booster relay 25 is interconnected to the conduit 16 that leads to the pneumatically operated control device 11, the conduit 16 having a temperature responsive valve means 78 that is formed remote from the housing 18 but could be part of the package of FIGS. 1-3, if desired. In any event, the temperature responsive valve means can form part of the control system 10 and control means 17 of this invention if it is desired to utilize such valve means 78 in the manner hereinafter illustrated and described.

The first controller 22 is so constructed and arranged that it is adapted to produce an output signal in its chamber 29 and, thus, in the passage 38 that progressively increases as the input pressure provided by the pressure source 12 to the chamber 27 of the first controller 22 increases in a manner hereinafter described, the output pressure signal being permitted to exist in the conduit 38 increases because the vacuum in the chamber 26 produced by the vacuum source 13 tends to open the valve member 37 to decrease the value of the signal in the conduit 38 by interconnecting the same to the atmosphere through the valve seat 36 while the pressure in the chamber 27 and the compression spring 40 tend to close the valve member 37 in opposition to the force of the vacuum in the chamber 26 and the pressure in the chamber 29 acting against the diaphragm 32 of the valve member 37 and tending to open the same.

The second controller 23 tends to produce a decreasing output signal once the input pressure from the source 12 reaches a certain value.

For example, the valve member 53 of the second controller 23 is held against the valve seat 52 by the force of the compression spring 54 in opposition to the force of the vacuum in the chamber 45 and the force of the pressure from the source 12 in the chamber 47 acting on the diaphragm 31 until a certain output pressure of the source 12 is reached whereby the valve member 53 is moved upwardly to interconnect the chamber portion 48 to the atmosphere through the valve seat 52 and thus decrease the signal in the conduit 38 progressively as the pressure value at the pressure source continues to increase for a purpose hereinafter described.

The third controller 24 acts in a manner similar to a pressure regulator whereby the same maintains or assures that the value of the pressure signal in the conduit 38 does not exceed a certain value for different values of the vacuum at the source 13. In particular, the third controller 24 will not permit the output signal in the conduit 38 to increase above a certain value for each level of vacuum at the source 13 because the valve member 64 is held close by the vacuum in the chamber 59 in opposition to the force of the spring 66 and the pressure in the chamber 61 acting on the diaphragm 32 in a direction that tends to open the valve seat 65 and dump the pressure in the conduit 38 to the atmosphere through the vent opening 68.

Thus, it can be seen that the controllers 22, 23 and 24 are all connected in parallel to the restrictor 39 and each of the devices 22, 23 and 24 will attempt to generate its own particular output signal. However, at any set of any inputs, one of the three devices 22, 23 or 24 will be producing a lower output then the other two and it will be in control as the other two devices in their attempt to produce their own outputs will close and in effect become inoperative whereby only one unit 22, 23 or 24 will be controlling at any one time and producing the signal in conduit 38 that will be directed to the chamber 72 of the booster relay 25 to cause the corresponding pressure signal to be produced by the booster relay 25 and be directed to the conduit 16 that leads to the control device 11 to operate the same in the manner and for the purpose previously described.

As previously stated, the control system 10 can include the temperature responsive valve means 78 which will prevent any pressure signal in the line 16 leading from the booster relay 25 from reaching the control device 11 if the temperature sensed by the means 78 is below the lowest temperature of a certain temperature range and will permit approximately 100% of the pressure signal in the line 16 from the booster relay 25 to reach the control device 11 if the temperature sensed by the means 78 is above the highest temperature of the certain temperature range, the means 78 substantially linearly increasing the percentage of the pressure signal from the booster relay 25 that is adapted to reach the control device 11 as the temperature sensed by the means 78 increases from the lowest temperature of the certain temperature range to the highest temperature of the certain temperature range.

While various forms of such a temperature responsive valve means 78 could be utilized for the above purpose, it is preferred that the device disclose and claimed in the concurrently filed patent application, Ser. No. 800,300 filed May 25, 1977 (Robertshaw Controls Company Docket No. 2728-ER) be utilized and the same will now be described in detail.

Figure 5:
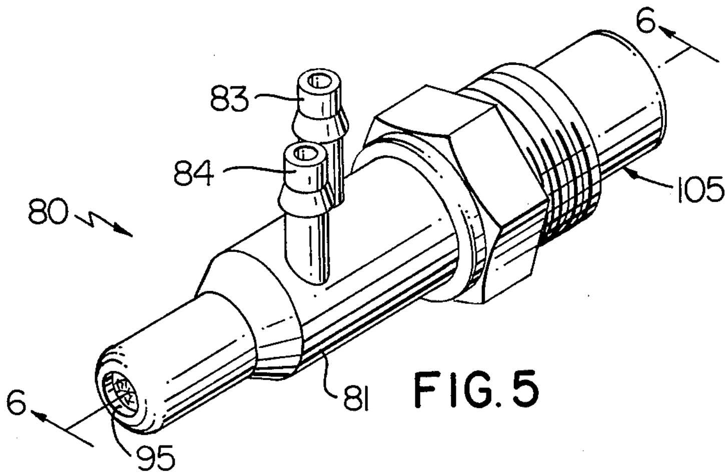
FIG. 5 is a perspective view of a temperature responsive valve means utilized in the control system of this invention.
Figure 6:
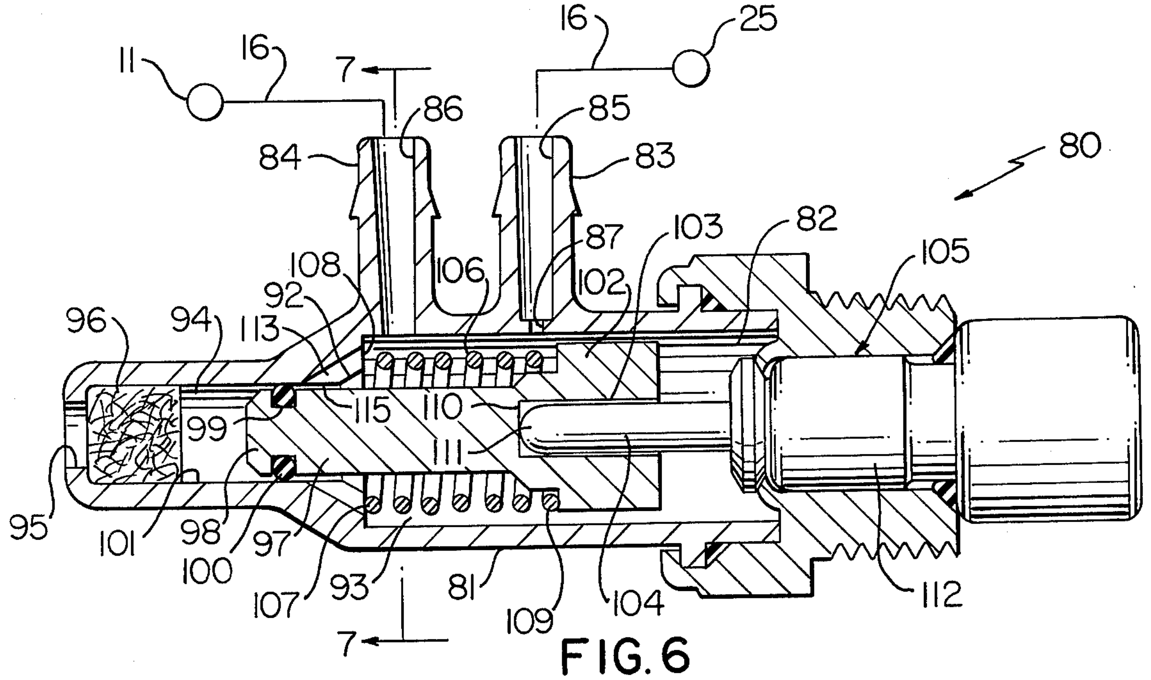
FIG. 6 is an enlarged cross-sectional view taken on line 6—6 of FIG. 5.
Figure 7:
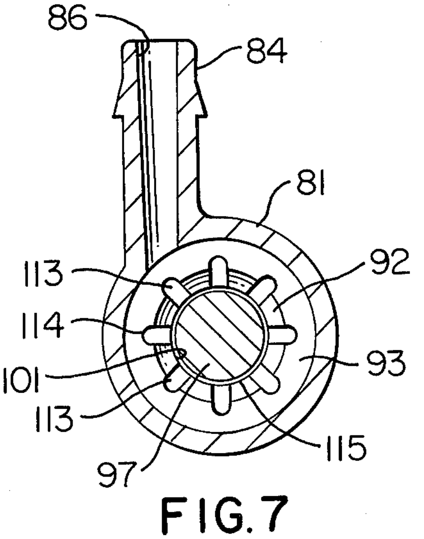
FIG. 7 is a cross-sectional view taken on line 7—7 of FIG. 6.

Referring now to FIGS. 5-7, the condition responsive by-pass valve construction is generally indicated by the reference numeral 80 and comprises a housing means 81 having a chamber 82 therein and a pair of nipples 83 and 84 respectively having passage means 85 and 86 therein leading to the chamber 82.

The passage 85 can comprise an inlet to the chamber 82 and has a restriction or orifice 87 therein whereby the inlet 85 is adapted to be interconnected by suitable conduit means 16 to the chamber 73 of the booster relay 25 while the other passage 86 can comprise an outlet that is adapted to be interconnected by suitable conduit means 16 to the fluid utilizing control device 11.

The chamber 82 of the housing means 81 has annular valve seat means 92 therein that leads from a larger cylindrical part 93 of the chamber 82 to a smaller coaxial cylindrical part 94 of the chamber 82 as illustrated, the inlet 85 and outlet 86 both being interconnected to the larger section 93 of the chamber 82 as illustrated.

The smaller cylindrical section 94 of the chamber 82 leads to the atmosphere through a vent outlet 95 and can have suitable filter material 96 disposed therein, if desired.

An axially movable substantially cylindrical valve member 97 is disposed for movement in the chamber 82 and has a forward portion 98 movable through the valve seat means 92 to control the same in a manner hereinafter described, the forward portion 98 of the valve member 97 having an annular groove 99 therein receiving an annular resilient O-ring member 100 which is adapted to slide in sealing engagement with the internal peripheral surface 101 of the housing 81 that defines the smaller cylindrical section 94 of the chamber 82 thereof. Thus, when the O-ring 100 is to the left of the groove means 92 as will be apparent hereinafter, the O-ring member 100 completely blocks and closes the inlet 85 from the outlet 95 so that 100% of the fluid entering the chamber 82 through the inlet 85 is adapted to pass out through the other outlet 86 to the utilization device 11 as will be apparent hereinafter.

The righthand end 102 of the valve member 97 is enlarged and is interrupted by a bore 103 which receives a piston member 104 of a temperature responsive piston and cylinder device that is generally indicated by the reference numeral 105 and which is carried by the housing means 81 as illustrated.

A compression spring 106 is disposed in the chamber 82 and has one end 107 bearing against an annular shoulder 108 of the housing 81 that is formed between the cylindrical sections 93 and 94 thereof and has the other end 109 thereof bearing against the enlarged end 102 of the valve member 97 to tend to urge the valve member 97 to the right in FIG. 6 so that the closed end 110 of the bore 103 of the valve member 97 is maintained in abutment against the end 111 of the piston 104 of the temperature responsive device 105 whereby the position of the valve member 97 in the housing means 81 is determined by the temperature responsive device 105 in a manner hereinafter described.

The temperature responsive device 105 has a cylinder part 112 that receives the piston member 104 therein whereby a wax charge or the like in the cylinder member 112 acts on the piston 104 to extend the same to the left in FIG. 6 as the temperature of the wax charge increases and as the temperature of the wax charge descreases, the same contracts and the force of the compression spring 106 moves the piston member 104 to the right in a manner well known in the art.

The annular valve seat means 92 of th housing means 81 has a plurality of tapering grooves 113 formed therein in a circular array and each being angled toward the longitudinal axis of the valve member 97 to intersect thereon at a point that is disposed between the valve seat means 92 and the outlet 95, each groove 113 having an arcuate wall 114 throughout the length thereof as illustrated in FIG. 7 whereby the right hand part 115 of the cylindrical peripheral surface 101 of the housing means 81 is interrupted by the circular array of grooves 113 to permit the opening and closing of the valve seat means 92 by the valve member 97 to provide a substantially linear percentage by-pass flow between the inlet 85 and the outlet 95 as the valve member 97 moves from a fully opened position to a fully closed position in a manner now to be described.

During the operation of the condition responsive by-pass valve construction 80, should the temperature being sensed by the device 105 be below the lowest temperature of a certain temperature range whereby the wax charge therein is in its fully contracted condition and the compression spring 106 has moved the valve member 97 to the right so that the O-ring 100 thereof is to the right of the valve seat means 92, substantially 100% of the fluid entering the chamber 82 through the inlet means 85 is adapted to be by-passed by the fully open valve seat means 92 to the outlet 95 whereby substantially zero percent of the fluid in the chamber 82 is directed out of the outlet 86 to the utilization device 11.

However, as the temperature of the device 105 linearly increases from the lowest temperature of the certain temperature range, the wax charge in the device 105 expands and moves the valve member 97 to the left in opposition to the force of the compression spring 106 to cause the O-ring 100 thereof to progressively move from the right hand end of the grooved portion 115 of the valve seat means 92 to the left hand part thereof to progressively close off the grooves 92 and thereby decrease the amount of fluid flow from the chamber 82 therethrough in substantially a linear manner. Thus, when the O-ring 100 reaches the left hand end of the grooved portion 115 of the valve seat means 92, the valve seat means 92 is completely closed so that no fluid is directed from the inlet 85 to the outlet 95 and substantially 100% of the fluid from the inlet 85 is directed by the outlet 86 to the utilization device 11.

Conversely, as the temperature of the device 105 decreases, the valve member 97 is moved from the position illustrated in FIG. 6 to the right to progressively open the grooved portion 115 of the valve seat means 92 to increase the amount of interconnection between the inlet 85 and the outlet 95 in substantially a linear manner.

The operation of the control system 10 of this invention and the control device 17 thereof will now be described.

Assuming that the pressure source is beginning to increase its pressure value thereof from a first pressure value and that the vacuum source 13 will be producing a vacuum at a constant value throughout the operation of the system 10 and assuming that the temperature being sensed is such that the temperature responsive device 78 is permitting 100% of the signal produced in the conduit 16 by the volume booster relay 25 to be passed to the control device 11 in the manner previously described for the temperature responsive device 80 of FIGS. 5–7, the signal being directed to the volume booster relay 25 and, thus, to the device 11 will progressively increase until the pressure value at the pressure source 12 reaches a second value thereof.

In particular, as the input pressure from the source 12 increases from zero to the first pressure value thereof, the force of the compression spring 40 of the controller 22 is maintaining the valve member 37 in its closed position against the valve seat 36 so that the signal pressure passing through the restrictor 39 into the conduit 38 is adapted to build up. However, when the output pressure from the source 12 reaches approximately the aforementioned first pressure valve thereof, the valve member 37 of the first controller 22 opens in a manner to cause the signal pressure in the conduit 38 to build up in a linear manner until the pressure value at the pressure source 12 reaches a second value thereof.

At this time, when the output pressure value from the source now reaches approximately the second pressure value thereof, the source pressure acting on the diaphragm 31 of the second controller 23 is now adapted to overcome the force of the compression spring 54 and permit the valve member 53 to open the valve seat 52 to cause the value of the pressure signal in the conduit 38 to now decrease substantially linearly as the output pressure value of the pressure at the source 12 further increases from the second pressure value thereof to the third pressure value thereof.

During such operation, the third controller 24 will prevent the value of the signal in the conduit 38 from increasing above a certain value as determined by the particular level of vacuum at the vacuum source 13 so that the third controller 24 does not normally affect the value of the signal in the conduit 38 during the operation of the system 10. However, if the pressure value of the signal being produced in the conduit 38 would increase beyond that certain value, the value seat 65 of the third controller 24 will open by the combination of the pressure acting downwardly on the diaphragm 32 and the force of the compression spring 66 being greater than the force of the vacuum in the chamber 59 tending to maintain the valve member 64 in its closed position whereby the controller 24 would vent the pressure in the conduit 38 back to the atmosphere to prevent the same from increasing beyond the certain value setting of the controller 24.

Thus, it can be seen that for any vacuum value of the vacuum source 13, the first controller 22 will operate to maintain an increasing output signal in the conduit 38 to the booster relay 25 and, thus, an increasing output signal to the control device 11 from the booster relay 25 as the magnitude of the output pressure of the source 12 increases from a first pressure value to a second pressure value at which point a further increase of the output pressure of the source 12 will cause the second controller 23 to cause a decrease in the signal in the conduit 38 to the booster relay 25 and, thus, to the control device 11 during a further increase in the output pressure of the source from the second pressure value thereof to a third pressure value thereof with the third controller 24 preventing the output signal in the conduit 38 of the system 10 from increasing beyond a certain value should the vacuum level of the source 13 be above a certain value.

Thus, it can be seen that the system 10 conditions the signal being sent to the control device in relation to the pressure value being produced at the pressure source 12 so that the signal increases substantially linearly in value as the pressure value of the source 12 increases from a first pressure value to a second pressure value and thereafter decreases substantially linearly in value as the pressure value of the source further increases from the second value thereof to a third value thereof, the system 10 producing such a conditional signal in substantially the same manner for each different level of vacuum that is produced at the vacuum source 13 but at different values for each different level of vacuum at the vacuum source 13.

Also, it can be seen that during the above described operation of the system 10 the temperature responsive valve means 78 will change the magnitude of the signal being directed to the control device 11 from zero percent if the device 80 is sensing a temperature below the lowest temperature in a certain temperature range to approximately 100% if the device 80 is sensing a temperature above the highest temperature of the certain temperature range with the magnitude of the signal being substantially a linear percent from zero to 100% as the temperature sensed increases from the lowest temperature in the certain temperature range to the highest temperature thereof.

Therefore, it can be seen that this invention not only provides an improved control system, but also this invention provides an improved control device for such a system or the like.

While the form of the invention now preferred has been illustrated and described as required by the Patent Statute, it is to be understood that other forms can be utilized and still fall within the scope of the appended claims.

What is claimed is:

1. A control system comprising a first source having a changeable fluid pressure value, a second source having a changeable vacuum value, a pressure operated control device that changes its operating condition in relation to the value of a pressure signal directed thereto, and pneumatically operated control means operatively interconnected to said sources and said control device for increasing said pressure signal from said first source to said device as the pressure value from said first source increases from a first value thereof to a second value thereof and for thereafter decreasing said pressure signal from said first source to said device as the pressure value from said first source further increases from said second value thereof to a third value thereof, said control means producing said signal in substantially the same manner but at different values for different levels of vacuum at said second source thereof.

2. A control system as set forth in claim 1 wherein said control means includes a plurality of pneumatically operated relays.

3. A control system as set forth in claim 2 wherein said relays are so constructed and arranged that only one of said relays effectively causes said increasing pressure signal from said first source to said device as the pressure value from said first source increases from said first value thereof to said second value thereof.

4. A control system as set forth in claim 2 wherein said relays are so constructed and arranged that only one of said relays effectively causes said decreasing pressure signal from said first source to said device as the pressure value from said first source further increases from said second value thereof to said third value thereof.

5. A control system as set forth in claim 2 wherein said relays are so constructed and arranged that only one of said relays is adapted to prevent said pressure signal from said first source to said device from increasing beyond a certain value when the level of vacuum at said second source thereof is at a certain level.

6. A control system as set forth in claim 2 wherein said relays comprise first, second and third relays being so constructed and arranged that only said first relay effectively causes said increasing pressure signal from said first source to said device as the pressure value from said first source increases from said first value to said second value, that only said second relay effectively causes said decreasing pressure signal from said first source to said device as the pressure value from said first source further increases from said second value to said third value, and that only said third relay is adapted to effectively prevent said pressure signal from increasing beyond a certain value when the level of vacuum at said second source thereof is at a certain value.

7. A control system as set forth in claim 1 wherein said control means includes means responsive to said second source for dumping said signal to atmosphere when the vacuum value of said second source exceeds a certain value.

8. A control system as set forth in claim 1 wherein said control means includes a volume booster relay for directing said signal to said device.

9. A control system as set forth in claim 1 wherein said control means includes means responsive to temperature for increasing the magnitude of said signal to said device as the temperature sensed thereby increases through a certain temperature range.

10. A control system as set forth in claim 9 wherein said means responsive to the temperature substantially linearly increases the magnitude of said signal as said sensed temperature linearly increases through said certain temperature range.

11. A control unit for a system having a first source provided with a changeable fluid pressure value and a second source provided with a changeable vacuum value and having a pressure operated control device that changes its operating condition in relation to the value of a pressure signal directed thereto, said control unit having pneumatically operated control means adapted to be operatively interconnected to said sources and said control device for increasing said pressure signal from said first source to said device as the pressure value from said first source increases from a first value thereof to a second value thereof and for thereafter decreasing said pressure signal from said first source to said device as the pressure value from said first source further increases from said second value thereof to a third value thereof, said control means being adapted to produce said signal in substantially the same manner but at different values for different levels of vacuum at said second source thereof.

12. A control unit as set forth in claim 11 wherein said control means includes a plurality of pneumatically operated relays.

13. A control unit as set forth in claim 12 wherein said relays are so constructed and arranged that only one of said relays is adapted to effectively cause said increasing pressure signal from said first source to said device as the pressure value from said first source increases from said first value thereof to said second value thereof.

14. A control unit as set forth in claim 12 wherein said relays are so constructed and arranged that only one of said relays is adapted to effectively cause said decreasing pressure signal from said first source to said device as the pressure value from said first source further increases from said second value thereof to said third value thereof.

15. A control unit as set forth in claim 12 wherein said relays are so constructed and arranged that only one of said relays is adapted to prevent said pressure signal from said first source to said device from increasing beyond a certain value when the level of vacuum at said second source thereof is at a certain level.

16. A control unit as set forth in claim 12 wherein said relays comprise first, second and third relays being so constructed and arranged that only said first relay is adapted to effectively cause said increasing pressure signal from said first source to said device as the pressure value from said first source increases from said first value to said second value, that only said second relay is adapted to effectively cause said decreasing pressure signal from said first source to said device as the pressure value from said first source further increases from said second value to said third value, and that only said third relay is adapted to effectively prevent said pressure signal from increasing beyond a certain value when the level of vacuum at said second source thereof is at a certain value.

17. A control unit as set forth in claim 11 wherein said control means includes means adapted to be responsive to said second source for dumping said signal to atmosphere when the vacuum value of said second source exceeds a certain value.

18. A control unit as set forth in claim 11 wherein said control means includes a volume booster relay for directing said signal to said device.

19. A control unit as set forth in claim 11 wherein said control means includes means responsive to temperature adapted for increasing the mangitude of said signal to said device as the temperature sensed thereby increases through a certain temperature range.

20. A control unit as set forth in claim 19 wherein said means responsive to the temperature is adapted to substantially linearly increase the magnitude of said signal as said sensed temperature linearly increases through said certain temperature range.

* * * * *